United States Patent

Regniere

[15] 3,651,275

[45] Mar. 21, 1972

[54] TOLL DIVERTING CIRCUIT

[72] Inventor: J. Ernest Regniere, St. Foy, Quebec, Canada

[73] Assignee: The Bell Telephone Company of Canada, Montreal, Quebec, Canada

[22] Filed: Nov. 24, 1969

[21] Appl. No.: 879,395

[52] U.S. Cl. ....................................179/27 CB, 179/18 DA

[51] Int. Cl. ....................................................H04m 3/60

[58] Field of Search ...............................179/27 CB, 18 DA

[56] References Cited

UNITED STATES PATENTS

| | | | |
|---|---|---|---|
| 3,331,926 | 7/1967 | Largey | 179/18 DA |
| 2,921,987 | 1/1960 | Pedrick | 179/27 CB |
| 2,875,286 | 2/1959 | Blashfield | 179/27 CB X |
| 2,871,301 | 1/1959 | Crow et al. | 179/27 CB |
| 2,852,614 | 9/1958 | Heyduck | 179/27 CB |

*Primary Examiner*—Kathleen H. Claffy
*Assistant Examiner*—Thomas W. Brown
*Attorney*—Philip T. Erickson

[57] ABSTRACT

A toll diverting circuit for use at a PBX location comprising a device for repeating the digits dialed from a PBX station towards a Central Office and a second device responsive to said digit repeating device for registering and analyzing at least the first three non-repetitive digits dialed to the Central Office. The analyzing device comprises first switching means for diverting a call to a PBX operator when the digits dialed are unauthorized, second switching means for opening the pulse repeating path and the diverting path when the digits dialed are authorized, and a third switching device for absorbing a first digit dialed and for diverting the call to the PBX operator when a subsequent non-authorized digit is dialed.

3 Claims, 1 Drawing Figure

PATENTED MAR 21 1972 3,651,275
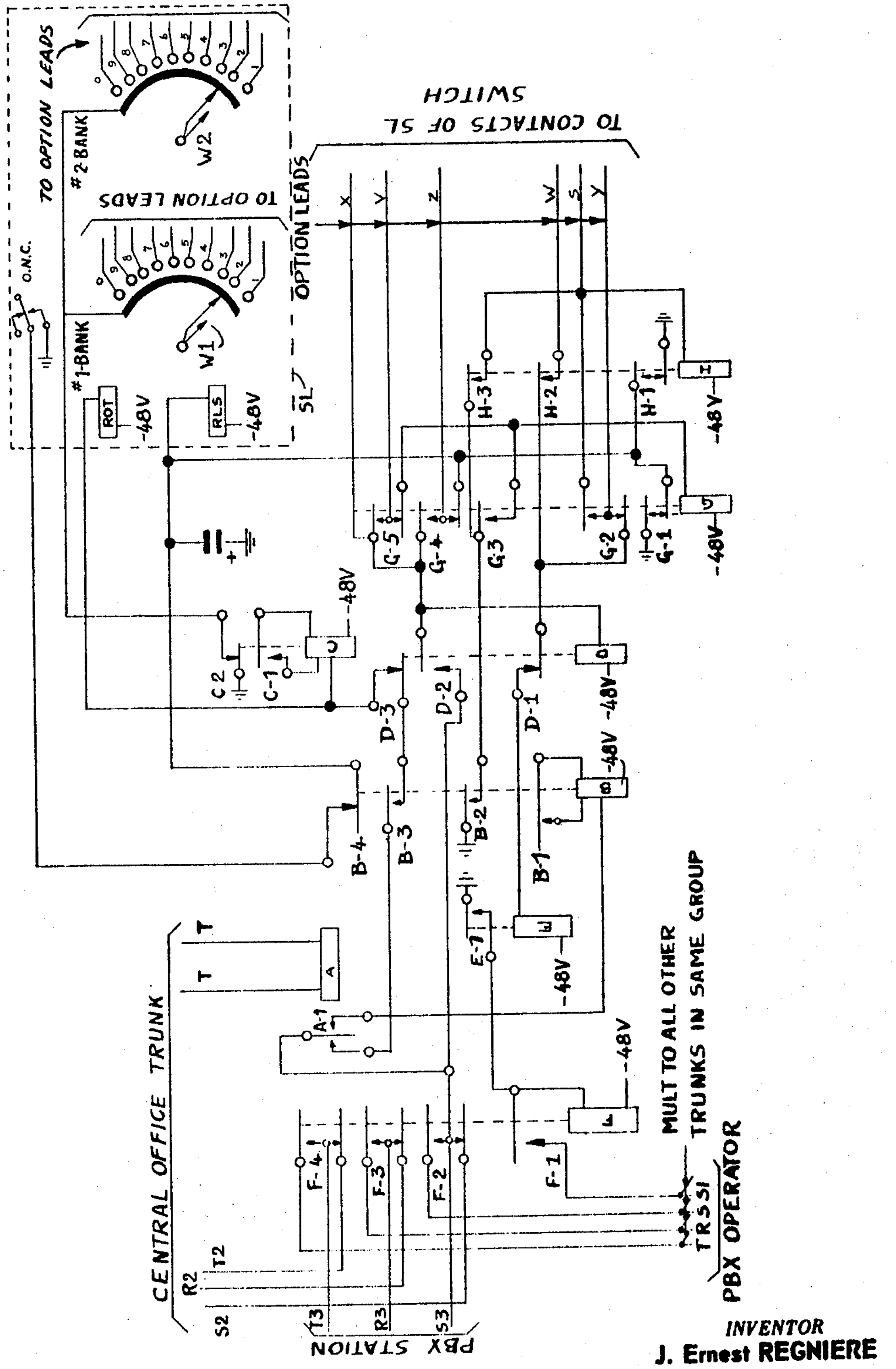
INVENTOR
J. Ernest REGNIERE
[signature]
ATTORNEY

TOLL DIVERTING CIRCUIT

This invention relates to a toll diverting circuit for use in the telephone switching field as an auxiliary circuit to be associated with a PBX (Private Branch Exchange) automatic switching system.

It has been known for some years to provide a service called toll diversion to PBX switching systems which serve large customers such as hotels, motels, hospitals and factories. However, the equipment provided for this service was part of and located at the Central Office of the telephone switching system, and very often crash jobs were necessary when customer requirements were not coincident with a Central Office regular program or when quantities installed were insufficient. Consequently, the customers often had to wait a long time before obtaining toll diverting circuits.

It is therefore the main feature of the present invention to provide a PBX located toll diverting circuit which could be included in the manufacturer's PBX package system, thus eliminating the long wait in obtaining a Central Office located toll diverting circuit.

It is also an important feature of the invention to provide a toll diverting circuit which not only allows access to local codes and denies access to direct distance dialing (DDD) codes, but also permits access to service codes and provides adaptation to various Central Office trunking patterns.

The toll diverting circuit, in accordance with the invention, comprises means for repeating the digits dialed from a PBX station towards a Central Office over a pulse repeating path, and means responsive to such digit repeating means for registering and analyzing at least the first three non-repetitive digits until a significant digit is dialed. The analyzing means comprises means for diverting a call to a PBX operator when the digits dialed are unauthorized (for instance DDD access codes 1 and 0), means for opening the pulse repeating path when the digits dialed are authorized, and means for absorbing predetermined digits and for diverting the call to the PBX operator when a subsequent unauthorized digit is dialed (for example permitting service code 411 but denying dialing of digits 2 to 9 after dialing the first digit 1 in an attempt to reach a DDD code as it is possible in Central Offices using Wannan selectors for permitting access to both DDD and service codes).

The means for registering the digits dialed from the PBX station may advantageously be a selector switch including selector banks, wipers movable over output contacts, a rotary magnet for stepping the movable wipers over the output contacts in accordance with the digits dialed, and a release magnet for releasing the selector switch.

The toll diverting circuit may also comprise means responsive to seizure of the diverting circuit by the Central Office for preparing the pulse repeating path to the rotary magnet of the selector switch so that the digits dialed may be repeated to the rotary magnet of the selector switch so that the digits dialed may be repeated to the rotary magnet of the selector switch.

The means for opening the pulse repeating path to the rotary switch may comprise a relay connected to predetermined output contacts of the selector switch. Similarly, the means for diverting the call to the PBX operator may comprise a relay connected to predetermined output contacts of the selector switch and adapted to energize a further relay for transferring the call to the PBX operator.

The above-mentioned analyzing means may also comprise means for absorbing repeatedly predetermined digits to accommodate various trunking patterns.

As mentioned previously, the analyzing means is also equipped with a circuit for absorbing predetermined digits for permitting access to service codes. Such circuit may comprise a relay connected to predetermined output contacts of the selector switch and energized when a digit corresponding to said predetermined output contacts is dialed (for example, digit 4 of information desk code 411). The operation of such relay energizes the release magnet of the selector switch to release the switch and so absorb the digit dialed. In addition, it opens the energization path of the relay means for diverting the call to the PBX operator so that the digit 1, which would normally be denied, may be dialed for permitting access to the information desk. Upon pulsing digit 1, a second relay is connected to output contact 1 of the selector switch through the contacts of the first relay. Such second relay energizes the release magnet of the selector switch to absorb digit 1. In addition, the energization of the second relay prepares a second energization path for diverting the call to the PBX operator which replaces the first disabled path. Such second energization path is connected to output contacts 2–9 of the selector switch to operate the relay for diverting the call if, after dialing the first digit 1, an attempt is made for reaching a DDD access code by dialing digits 2—9.

Finally, the toll diverting circuit may also be equipped with means to permit access to service codes such as 114 while denying access to DDD access codes 112 and 110 when such access codes are used. Such a means comprises a relay connected to output contact 1 of the selector switch and adapted to be energized when such digit is dialed. The energization of such a relay energizes the release magnet of the selector switch to absorb the digit 1 (twice) and prepares a circuit for the energization of the second energization path for the relay for diverting the call to the PBX operator. Such second circuit is connected to output contacts 0 or 2 and causes energization of the relay for diverting the call to the PBX operator if digits 0 or 2 are dialed.

The invention will now be disclosed with reference to the accompanying drawings which illustrate a preferred embodiment of a toll diverting circuit in accordance with the invention.

In the drawings, there is shown a toll diverting circuit for use at a PBX location for repeating, registering and analyzing the digits dialed into a Central Office trunk from a PBX station and for transferring the call to a PBX operator when unauthorized digits are dialed. The diverting circuit is also capable of disabling itself if the digits dialed are authorized. In addition, the diverting circuit permits access to service codes while denying "sneak" calls which may be attempted to a DDD code by dialing part of the service code first.

Generally speaking, the means for repeating the digits dialed from the Central Office is a relay A which is initially energized upon seizure of the toll diverting circuit and subsequently released and reenergized in accordance with the digits dialed to repeat such digits to a selector switch SL having a number of selector banks such as banks No. 1 and No. 2, output contacts 0—9 in each bank, and wipers W1 and W2 adapted to be stepped over the contacts 0–9 by a rotary magnet ROT. The selector switch SL further comprises a release magnet RLS for releasing the selector switch as commonly known in the art.

The output contacts of the selector switch SL may be connected to option leads X, V, Z, W, S or Y in accordance with predetermined desired options. The connection of predetermined output contacts of the selector switch SL energizes relays D, E, F, G or H in accordance with the desired option and such will be disclosed fully in the following part of the disclosure which is broken in various sections for the purpose of more clearly disclosing the invention.

Seizure of Circuit

The toll diverting circuit is seized when battery and group are returned from the Central Office on leads T and T for energizing relay A. The energization of relay A moves contact A-1 towards the right and places a ground from the sleeve S3 of the PBX station to relay B to operate such relay B. The energization of relay B performs the following functions:

1 - Closes contacts B-1 to render relay B slow release;

2 - Closes contacts B-2 for locking relays G and H as it will be disclosed later on in the description;

3 - Closes contacts B-3 to prepare a pulse repeating path over normally closed contacts D-3 magnet ROT of the selector switch SL; and to the rotary magnet 4 - Opens contacts B-4 the function of which would be disclosed later.

When a digit is dialed, relay A follows the pulses to apply ground from sleeve S3 through contacts A-1 (when moved towards the left) and closed contacts B-3 and D-3 to rotary magnet ROT. Each energization of rotary magnet ROT steps the wipers W1 and W2 over output contacts 0–9 in a known manner.

The first pulse that appears on the pulse repeating path also energizes relay C. The operation of relay C closes contacts C-1 to render relay C slow release. In addition, it opens contacts C-2 to remove ground from the wipers W1 and W2 throughout the pulse train during their travel. Once the pulse train has ceased, at the end of each digit, relay C is released and ground is applied back to wipers W1 and W2. This ground appears at the output terminals of the selector switch SL where the optioning is done.

Grounds on option leads a. X lead

The X lead is connected to the output contacts corresponding to predetermined digits to be authorized. A ground on lead X energizes relay D. The operation of relay D performs the following functions:

1. - Opens contacts D-1 in the energization path of relay E whose functions will be disclosed later;

2. - Closes contacts D-2 for locking relay D to the sleeve S3 of the PBX station; and 3. - Opens contacts D-3 in the pulse repeating path to rotary magnet ROT.

Upon opening the pulse repeating path, wipers W1 and W2 remain parked on the output contact corresponding to the digit dialed until the complete telephone number is called. When the called party answers, the polarity is reversed on relay A, in a known manner, and relay A is released causing the release of relays B and C. The release of relay B causes the closure of contacts B-4 which apply ground to the release magnet RLS of the selector switch through off-normal contacts ONC and so release the selector switch in a known manner. In addition, ground is removed from lead X when the wipers return to home position and relay D is released to return the toll diverting circuit to its original state.

b. Y lead

The Y lead is normally connected to output contacts 1 and 0 of the selector switch SL to deny access to DDD access codes 1 and 0. A ground on lead Y over lower normally closed contacts G-2 and D-1 operates relay E. The energization or relay E closes contacts E-1 to energize relay F which operates transfer contacts F-2, F-3 and F-4 to transfer PBX trunk leads T3, R3 and S3 from Central Office trunk leads T2, R2 and S2 to the PBX operator's trunk leads T, R and S. In addition, relay F locks operated to sleeve lead S1 under the control of the PBX operator.

The Central Office trunk is then released and potential is removed from relay A which is consequently deenergized. The release of relay A causes the subsequent release of relays B and C. The release of relay B causes, as mentioned previously, the energization of release magnet RLS through closed contacts B-4 and the off-normal contacts ONC of the selector switch SL. The above causes the return of the wiper W1 to W2 to home position and the subsequent release of relay E. The toll diverting circuit is returned to normal except for relay F which is held operated under the control of the PBX operator.

c. Z lead

The Z lead is connected to the output contacts of the selector switch which are to be absorbed repeatedly to suit various trunking patterns in smaller Central Offices. The Z lead is connected to the release magnet of the selector switch SL over lower normally closed contacts G-4 to release the selector switch in a known manner.

d. V lead

The V lead is connected to output contacts of the selector switch when the first digit of a code is desired to be absorbed. The V lead is connected to relay G which, when energized, performs the following functions:

1. - Applies a temporary ground to the release magnet RLS through make before break contacts G-1 to release the selector switch and so absorb the digit dialed;
2. - Transfers the Y option to an S option (nonsignificant at this stage but will be in a later part of the description);
3. - Locks itself operated through its own contacts G-3 and closed contacts B-2; and
4 - Transfers Z and V options to X options through contacts G-4 and G-5.

e. W lead

The W lead is connected to output contacts 2–9 of selector switch SL. This option is used in conjunction with the option V above to permit access to service codes such as the information desk code 411 while preventing sneak calls to DDD access codes through dialing the first two digits of the service code number. If the service code is 411, the output contacts "4" of the selector switch SL will be connected to lead V. The pulsing of digit 4 will operate relay G as mentioned above and, more particularly, will transfer the Y option disclosed above into an S option to be disclosed later, that is the output contacts connected to lead Y (1 and 0) will be connected to lead S through contacts G-2 of relay G. The subsequent dialing of digit 1 will consequently cause a ground to be applied to relay H via contacts G-2 of relay G to energize relay H. The operation of relay H will perform the following functions:

1 - Apply a temporary ground on release magnet RLS through make before break contacts H-1 to release the selector switch and so absorb the digit dialed;
2 - Close a second energization path for the diverting relay E through contacts H-2 and normally closed contacts D-1; and
3 - Lock itself operated through its own contacts H-3 and closed contacts B-2.

If the following digit is the last digit 1 of the information desk, the operator at the information desk will pick up the call and the reversal of polarity at the Central Office will release relays A, B and C. The release of relay B will open contacts B-2 and so release relays G and H to bring the toll diverting circuit back to normal.

If, on the contrary, a "sneak" call is attempted by dialing digits 2–9 in place of the last digit 1, ground will be applied to diverting relay E through closed contacts H-2 and D-1 to divert the call to the PBX operator.

f. S lead

This option is used to provide access to service codes such as 114 while denying access to DDD access code 110 and 112 when such access codes are used instead of codes 0 or 1. The S lead is connected to output contact 1. In addition, the W lead is connected to output contacts 0 and 2 and the Y lead is not connected at all. Ground on lead S will operate relay H which will perform the function described previously in connection with the W option. Since lead W is connected to output contacts 2 and 0, the dialing of such digits will energize relay E to divert the call. If other service codes such as code 114, for example, are dialed, the code will be allowed and the operator at the service codes desk will answer the call.

To summarize the above, where the codes 0 and 1 are used to obtain access to direct distance dialing and the codes 411 and 611 are used for information and repair service respectively, and where certain repeated digits other than 0 and 1 are used for trunking patterns in small Central Offices, the following connections of the leads X, Y, Z, V, W and S to the number positions on one or another of the banks of the selector switch are used:

X... 2, 3, 5, 7, 8, and 9 except for digits used for Z.
Y... 0 and 1.
Z... Selected digits among 2, 3, 5, 7, 8, and 9.
V... 4 and 6.
W... 2, 3, 4, 5, 6, 7, 8, and 9.
S... not connected.

Where the codes 110 and 112 are used to obtain access to direct distance dialing, the following connections are used:

X... 2, 3, 4, 5, 6, 7, 8, 9.
Y... not connected.

Z... not connected.
V... not connected.
W... 0 and 2.
S... 1.

From the above, it may be seen that the diverting circuit, in accordance with the invention, is very simple and that the various options are centered on the selector banks. No further engineering efforts are required. Once the options have been selected and placed, no supervision is required.

Another advantage is that the circuit comprises a minimum of parts and takes very little space on the customer's premises where such space is usually at a premium.

In the above description, the various options have been disclosed in connection with the access and service codes at present in use. However, it is to be understood that such options could be easily modified to suit other access and service codes.

I claim:

1. A toll call diverting circuit for use at a PBX location comprising:

a. a single selector switch arranged for repeating digits dialed in sequence from a PBX station towards a Central Office;

b. means for the disabling, during the repetition of digits by said selector, of circuits adapted to be established through any selector bank and wiper combination of said selector;

c. means for diverting a call to an operator position in response to means hereinbelow mentioned;

d. means including connections to said selector for conditionally operating said diverting means upon the dialing of digit 1 or 0, the condition being that said connections are not transferred as hereinbelow specified;

e. means for allowing a call upon the dialing of certain digits regardless of the position of such a digit in the dialed sequence, except after the operation of the absorbing and transferring means specified hereinbelow, said means for allowing a call comprising:

i. means for blocking said diverting means;

ii. means for preventing further repetition of digits by said selector switch and iii. means for holding the preceding two means in operation so long as a ground connection persists on the sleeve conductor related to the PBX station;

f. means for absorbing the first digit of a service code beginning with a digit other than 1 or 0 and for transferring the selector connection corresponding to digit 1 or digit 0 of the aforesaid means for operating said diverting means to activate a circuit which is adapted to absorb the said digits and further adapted to prepare a path for operating said diverting means only in the event that a digit other than 1 and other than 0 is thereafter dialed, and g. means including connections to said selector for operating said diverting means after said absorbing and transferring means shall have operated in the event that certain digits are thereafter dialed in the same sequence as a digit in response to which said absorbing and transferring means was caused to operate.

2. A toll call diverting circuit as defined in claim 1 which also comprises means for repeatedly absorbing one or more digits other than 0 or 1 and in which such digits adapted to be absorbed are accordingly not included among the digits to which said means for allowing a call is adapted to respond.

3. A toll call diverting circuit as defined in claim 2 in which the part g means is connected to terminals of a bank of said selector corresponding to digits 2, 3, 4, 5, 6, 7, 8, and 9.

* * * * *